US010788210B2

(12) United States Patent
Burd (10) Patent No.: US 10,788,210 B2
(45) Date of Patent: Sep. 29, 2020

(54) SINGLE-WALLED COMBUSTOR FOR A GAS TURBINE ENGINE AND METHOD OF MANUFACTURE

(71) Applicant: United Technologies Corporation, Hartford, CT (US)

(72) Inventor: Steven W. Burd, Cheshire, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 763 days.

(21) Appl. No.: 14/849,017

(22) Filed: Sep. 9, 2015

(65) Prior Publication Data

US 2016/0069567 A1 Mar. 10, 2016

Related U.S. Application Data

(60) Provisional application No. 62/047,954, filed on Sep. 9, 2014.

(51) Int. Cl.
*F23R 3/00* (2006.01)
*F23R 3/06* (2006.01)
(Continued)

(52) U.S. Cl.
CPC ............... *F23R 3/002* (2013.01); *F02C 7/18* (2013.01); *F23M 5/085* (2013.01); *F23R 3/06* (2013.01);
(Continued)

(58) Field of Classification Search
CPC ............ F23R 3/002; F23R 2900/03042; F23R 2900/00018; F23R 3/04; F23R 3/06;
(Continued)

(56) References Cited

U.S. PATENT DOCUMENTS

| 4,338,360 A | * | 7/1982 | Cavanagh | ................. C23C 4/01 427/247 |
| 5,130,163 A | * | 7/1992 | Clingman | ................. C23C 4/02 427/226 |

(Continued)

OTHER PUBLICATIONS

EP search report for EP15183923.0 dated Jan. 18, 2016.

*Primary Examiner* — Alain Chau
(74) *Attorney, Agent, or Firm* — Getz Balich LLC (57) ABSTRACT

A single-walled combustor includes a multi-layered wall having a first face defining a cooling plenum and an opposite second face. A thermal barrier coating of the wall may be secured to the second face and defines at least in-part a combustion chamber. A plurality of cooling circuits each extend through the base layer and the thermal barrier coating for flowing cooling air from the plenum and into the combustion chamber. Each circuit includes a first surface recessed from the second face and spaced from the thermal barrier coating with a channel defined in-part by the first surface and covered by the thermal barrier coating. A hole in the thermal barrier coating is in fluid communication between the channel and the combustion chamber. A method of manufacturing the circuit includes fabricating the base layer with the aperture and hole; then placing an insert into the channel prior to application of the coating over the base layer and insert. The insert is then removed and the film cooling hole is formed through the coating.

12 Claims, 6 Drawing Sheets

(51) Int. Cl.
*F23M 5/08* (2006.01)
*F02C 7/18* (2006.01)
*F23R 3/50* (2006.01)

(52) U.S. Cl.
CPC .... *F05D 2230/90* (2013.01); *F05D 2260/202* (2013.01); *F23R 3/50* (2013.01); *F23R 2900/00018* (2013.01); *F23R 2900/03041* (2013.01); *F23R 2900/03042* (2013.01); *F23R 2900/03043* (2013.01); *Y02T 50/675* (2013.01); *Y02T 50/6765* (2018.05)

(58) Field of Classification Search
CPC .. F23R 3/50; F05D 2230/90; F05D 2260/202; F05D 2260/204; F23M 5/08; F23M 5/085; Y02T 50/675; Y02T 50/6765; F02C 7/12; F02C 7/18
See application file for complete search history.

(56) References Cited

U.S. PATENT DOCUMENTS

| | | | | |
|---|---|---|---|---|
| 5,195,243 A | * | 3/1993 | Junod | C23C 4/185 29/460 |
| 5,233,828 A | * | 8/1993 | Napoli | F02K 1/822 60/755 |
| 5,375,973 A | * | 12/1994 | Sloop | F01D 11/08 415/115 |
| 5,528,904 A | * | 6/1996 | Jones | F01D 5/288 60/753 |
| 5,626,462 A | * | 5/1997 | Jackson | C22C 32/00 416/229 A |
| 5,647,202 A | * | 7/1997 | Althaus | F23R 3/002 60/266 |
| 5,737,922 A | * | 4/1998 | Schoenman | F23R 3/002 60/752 |
| 6,214,248 B1 | * | 4/2001 | Browning | B23P 15/04 216/17 |
| 6,282,905 B1 | * | 9/2001 | Sato | F23R 3/002 60/752 |
| 6,321,449 B2 | * | 11/2001 | Zhao | B23P 15/04 29/890.01 |
| 6,761,956 B2 | * | 7/2004 | Lee | C23C 28/321 428/131 |
| 6,921,014 B2 | * | 7/2005 | Hasz | C23C 26/02 228/122.1 |
| 7,270,175 B2 | | 9/2007 | Mayer et al. | |
| 7,413,808 B2 | | 8/2008 | Burd et al. | |
| 7,464,554 B2 | | 12/2008 | Cheung et al. | |
| 8,157,526 B2 | * | 4/2012 | Beck | F01D 5/186 416/97 R |
| 8,167,558 B2 | * | 5/2012 | Liang | F01D 5/187 415/115 |
| 8,216,687 B2 | | 7/2012 | Burd et al. | |
| 8,292,584 B2 | * | 10/2012 | Beck | F01D 5/186 416/97 R |
| 8,359,865 B2 | | 1/2013 | Dierberger et al. | |
| 8,359,866 B2 | | 1/2013 | Dierberger et al. | |
| 8,475,945 B2 | | 7/2013 | Schmidt et al. | |
| 8,647,053 B2 | * | 2/2014 | Hsu | F01D 9/023 415/115 |
| 8,651,805 B2 | * | 2/2014 | Lacy | F01D 5/186 415/178 |
| 8,661,827 B2 | * | 3/2014 | Morimoto | B23K 1/0018 29/463 |
| 8,683,814 B2 | | 4/2014 | Xu | |
| 8,905,713 B2 | * | 12/2014 | Bunker | F01D 5/186 416/97 R |
| 8,978,385 B2 | | 3/2015 | Cunha | |
| 9,021,675 B2 | | 5/2015 | Rose | |
| 9,057,523 B2 | | 6/2015 | Cunha et al. | |
| 9,194,585 B2 | | 11/2015 | Cunha et al. | |
| 9,249,672 B2 | * | 2/2016 | Bunker | F01D 5/147 |
| 2004/0123598 A1 | | 7/2004 | Ackermann et al. | |
| 2006/0016191 A1 | * | 1/2006 | Woodcock | C23C 4/18 60/754 |
| 2008/0226871 A1 | * | 9/2008 | Klein | C23C 14/042 428/138 |
| 2008/0276619 A1 | * | 11/2008 | Chopra | F01D 9/023 60/760 |
| 2011/0259017 A1 | * | 10/2011 | Lacy | F01D 25/12 60/806 |
| 2012/0148769 A1 | * | 6/2012 | Bunker | B23P 15/04 428/34.1 |
| 2012/0255870 A1 | | 10/2012 | Rebak et al. | |
| 2013/0025287 A1 | * | 1/2013 | Cunha | F23R 3/002 60/772 |
| 2013/0078428 A1 | * | 3/2013 | Bunker | F01D 5/147 428/167 |
| 2013/0086784 A1 | * | 4/2013 | Bunker | C23C 4/00 29/402.03 |
| 2013/0101761 A1 | | 4/2013 | Bunker et al. | |
| 2014/0116660 A1 | * | 5/2014 | Butler | F01D 5/288 165/133 |
| 2014/0120274 A1 | * | 5/2014 | Bunker | C23C 14/5886 428/34.1 |
| 2014/0220253 A1 | * | 8/2014 | Bunker | F01D 5/187 427/448 |
| 2015/0251280 A1 | * | 9/2015 | Bunker | C23C 4/00 29/402.18 |

* cited by examiner

SINGLE-WALLED COMBUSTOR FOR A GAS TURBINE ENGINE AND METHOD OF MANUFACTURE

This application claims priority to U.S. Patent Appln. No. 62/047,954 filed Sep. 9, 2014.

BACKGROUND

The present disclosure relates to a gas turbine engine and, more particularly, to a combustor liner having film cooling circuits.

Gas turbine engines, such as those that power modern commercial and military aircraft, include a fan section to propel the aircraft, compressor section to pressurize a supply of air from the fan section, a combustor section to burn a hydrocarbon fuel in the presence of the pressurized air, and a turbine section to extract energy from the resultant combustion gases and generate thrust.

The combustor section may have an annular wall having inner and outer shells that support respective inner and outer heat shielding liners. The liners may be comprised of a plurality of floating heat shields or panels that together define an annular combustion chamber. An annular cooling plenum is defined between the respective shells and liners for supplying cooling air to an opposite hot side of the panels through a plurality of strategically placed film cooling holes. The film cooling holes are generally orientated to create a protective blanket, or, air film over the hot side of the panels, thereby protecting the panels from the hot combustion gases in the chamber.

Unfortunately, placing and/or distributing known film cooling holes across the panel to achieve an even temperature distribution is difficult. This difficulty is further aggravated due to structural obstacles and/or panel features that disrupt the formation of the cooling air film. Uneven temperature distributions or panel hotspots create thermal mechanical stresses that lead to cracking and a shortened panel lifespan. Moreover, the complexity of dual walls (i.e. shell and liner) is generally heavy, expensive to manufacture, and difficult to maintain.

SUMMARY

A single-walled combustor according to one, non-limiting, embodiment of the present disclosure includes a base layer having a first face defining in-part a cooling plenum and an opposite second face; a thermal barrier coating placed over the second face and defining at least in-part a combustion chamber; and a plurality of cooling circuits with each circuit extending through the base layer and the thermal barrier coating and being in fluid communication between the cooling plenum and the combustion chamber, wherein each circuit includes a first surface recessed from the second face and spaced from the thermal barrier coating with a channel defined by the first surface and the thermal barrier coating and a hole in the thermal barrier coating being in fluid communication between the channel and the combustion chamber.

Additionally to the foregoing embodiment, each cooling circuit includes an aperture extending through the first face and the first surface and being in fluid communication between the cooling plenum and the channel.

In the alternative or additionally thereto, in the foregoing embodiment, the aperture includes an inlet defined by the first face and an outlet defined by the first surface.

In the alternative or additionally thereto, in the foregoing embodiment, the coating includes a bond coat adhered to the second face and defining in-part the channel.

In the alternative or additionally thereto, in the foregoing embodiment, the coating includes a thermal barrier coat covering the bond coat, and the hole communicates through the bond coat and the thermal barrier coat.

In the alternative or additionally thereto, in the foregoing embodiment, the hole is a film cooling hole.

In the alternative or additionally thereto, in the foregoing embodiment, the hole is a film cooling hole.

In the alternative or additionally thereto, in the foregoing embodiment, the aperture is defined by a second surface extending continuously about an aperture centerline that generally traverses the first surface.

In the alternative or additionally thereto, in the foregoing embodiment, the base layer is made of sheet metal.

In the alternative or additionally thereto, in the foregoing embodiment, the base layer is circumferentially continuous about an engine axis.

In the alternative or additionally thereto, in the foregoing embodiment, the combustor includes an inner base layer spaced radially inward from the base layer being an outer base layer; a second thermal barrier coating secured to the inner base layer and opposing the thermal barrier coating being a first thermal barrier coating; and a second plurality of cooling circuits extending through the inner base layer and the second thermal barrier coating, wherein the combustion chamber is annular in shape and defined at least in-part by the first and second thermal barrier coatings.

In the alternative or additionally thereto, in the foregoing embodiment, the film cooling hole is defined by a third surface carried by the thermal barrier coating and extending continuously about a centerline of the hole that is angled with respect to a hot face of the thermal barrier coating that defines at least in-part the combustion chamber.

In the alternative or additionally thereto, in the foregoing embodiment, the combustor includes a structural layer disposed between the coating and the base layer with the hole communicating through the structural layer.

In the alternative or additionally thereto, in the foregoing embodiment, the combustor includes a pedestal in the channel and extending between and engaged to the first surface and the coating.

In the alternative or additionally thereto, in the foregoing embodiment, a direction of cooling flow through the channel is substantially planar to the base layer and angled with a direction of flow through the hole.

In the alternative or additionally thereto, in the foregoing embodiment, the hole is one of a plurality of holes.

A method of manufacturing a film cooling circuit for a single-walled combustor according to another, non-limiting, embodiment includes the steps of fabricating at least a portion of a base layer including a channel of the circuit; placing a sacrificial insert into the channel; placing a coating over the base layer and the insert; and forming a film cooling hole through the coating that is in fluid communication with the channel.

Additionally to the foregoing embodiment, the fabricated base layer has an aperture in fluid communication with the channel and the insert is removed through at least one of the aperture and the film cooling hole.

In the alternative or additionally thereto, in the foregoing embodiment, the step of placing a coating includes securing a first layer over the base layer and insert then placing a thermal barrier layer over the first layer.

In the alternative or additionally thereto, in the foregoing embodiment, the first layer is a bond layer secured to the base layer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
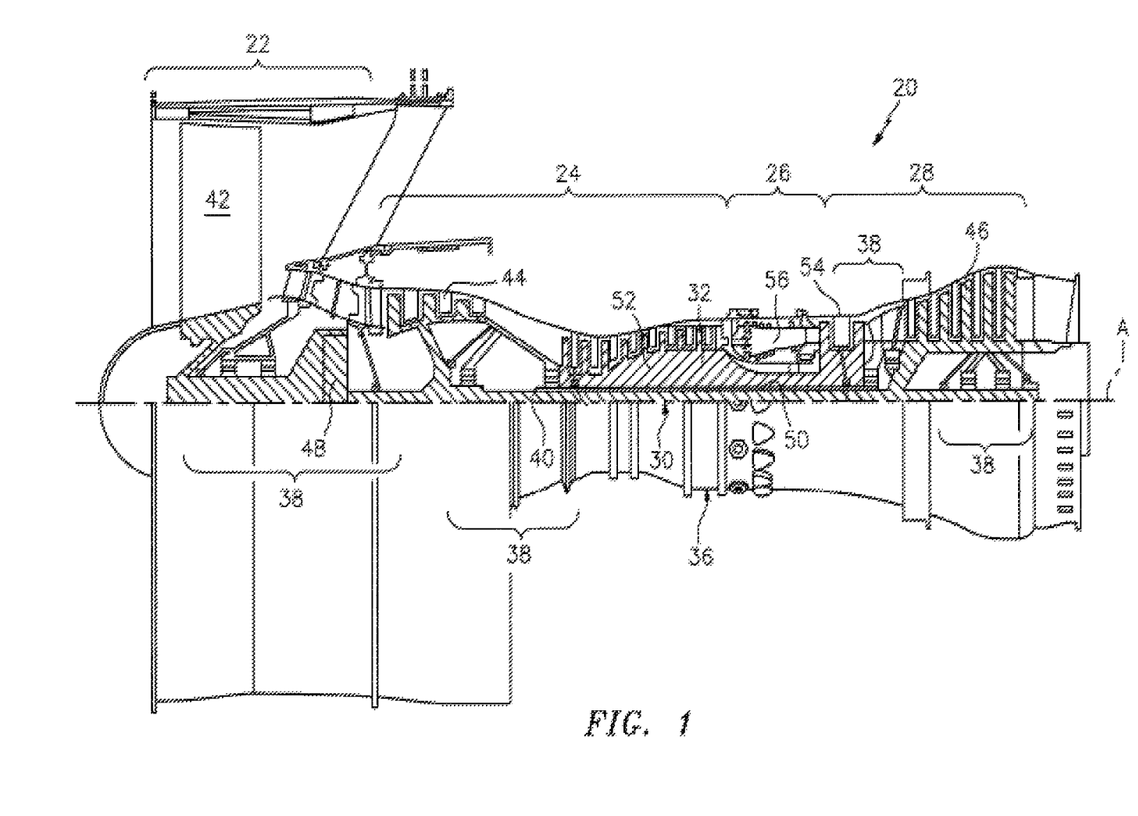
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a LPC 44 of the compressor section 24 and a LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a HPC 52 of the compressor section 24 and HPT 54 of the turbine section 28. A combustor 56 of the combustor section 26 is arranged between the HPC 52 and the HPT 54. The inner shaft 40 and the outer shaft 50 are concentric and rotate about the engine central longitudinal axis A that is collinear with their longitudinal axes. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Figure 2:
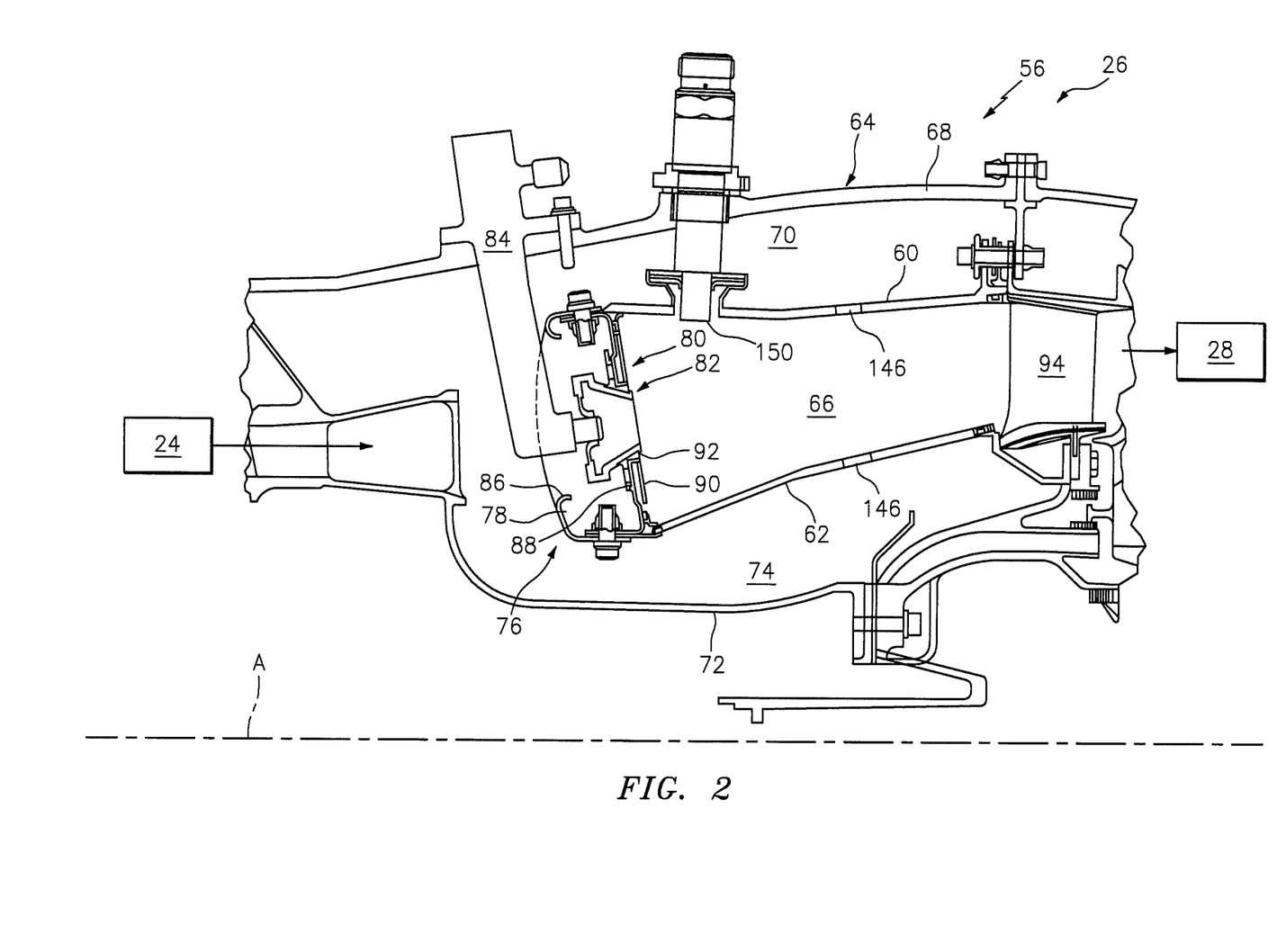
FIG. 2 is a partial cross-section of a combustor of the engine.

With reference to FIG. 2, the combustor section 26 generally includes a single-walled combustor 56 with a multi-layered outer wall 60, a multi-layered inner wall 62, and a diffuser case module 64 that encases walls 60, 62. The outer wall 60 and the inner wall 62 are radially spaced apart such that an annular combustion chamber 66 is defined therebetween. The outer wall 60 is spaced radially inward from an outer diffuser case 68 of the diffuser case module 64 to define an outer annular plenum 70. The inner wall 62 is spaced radially outward from an inner diffuser case 72 of the diffuser case module 64 to define an inner annular plenum 74. The term "single-walled combustor" reflects the difference between more traditional combustors that utilize a dual-walled orientation with the inner and outer walls each having a shell spaced from a liner, as compared to the present disclosure wherein the shell and liner are generally replaced with a single, yet multi-layered, wall for at least one of the outer and inner walls 60, 62. It should be understood that although a particular combustor is illustrated, other combustor types with various combustor wall arrangements will also benefit. It should be further understood that the disclosed cooling flow paths are but an illustrated embodiment and should not be limited.

The combustion chamber 66 contains the combustion products that flow axially toward the turbine section 28. Each combustor wall 60, 62 may be generally cylindrical and extend circumferentially about the engine axis. The walls 60, 62 may each be a single panel or formed utilizing a plurality of panels. The panel(s) may be circumferentially continuous (i.e. ring shaped) and divided axially, may be divided circumferentially from each, or both (i.e. substantially rectilinear in shape).

The combustor 56 further includes a forward assembly 76 immediately downstream of the compressor section 24 to receive compressed airflow therefrom. The forward assembly 76 generally includes an annular hood 78, a bulkhead assembly 80, and a plurality of swirlers 82 (one shown). Each of the swirlers 82 is circumferentially aligned with one of a plurality of fuel nozzles 84 (one shown) and a respective one of a plurality of hood ports 86. The bulkhead assembly 80 includes a bulkhead support shell 88 secured to the combustor walls 60, 62, and a plurality of circumferentially distributed bulkhead heat shields or panels 90 secured to the bulkhead support shell 88 around each of a respective swirler opening 92. The bulkhead support shell 88 is generally annular and the plurality of circumferentially distributed bulkhead panels 90 are segmented, typically one to each fuel nozzle 84 and swirler 82. It is further contemplated and understood that the heat shield(s) 90 and support shell(s) 88 may be replaced with a multi-layered, single, wall similar to the walls 60, 62.

The annular hood 78 extends radially between, and is secured to, the forwardmost ends of the combustor walls 60, 62. Each one of the plurality of circumferentially distributed hood ports 86 receives a respective one of the plurality of fuel nozzles 84 and facilitates the direction of compressed air into the forward end of the combustion chamber 66 through the swirler opening 92. Each fuel nozzle 84 may be secured to the diffuser case module 64 and projects through one of the hood ports 86 into the respective swirler opening 92.

The forward assembly 76 introduces core combustion air into the forward section of the combustion chamber 66 while the remainder enters the outer annular plenum 72 and the inner annular plenum 74. The plurality of fuel nozzles 84 and adjacent structure generate a blended fuel-air mixture that supports stable combustion in the combustion chamber 66.

Opposite the forward assembly 76, the outer and inner walls 60, 62 may be mounted adjacent to a first row of Nozzle Guide Vanes (NGVs) 94 in the HPT 54. The NGVs 94 are static engine components that direct core airflow combustion gases onto the turbine blades of the first turbine rotor in the turbine section 28 to facilitate the conversion of pressure energy into kinetic energy. The core airflow combustion gases are also accelerated by the NGVs 94 because of their convergent shape and are typically given a "spin" or a "swirl" in the direction of turbine rotor rotation. The turbine rotor blades absorb this energy to drive the turbine rotor at high speed.

Figure 3:
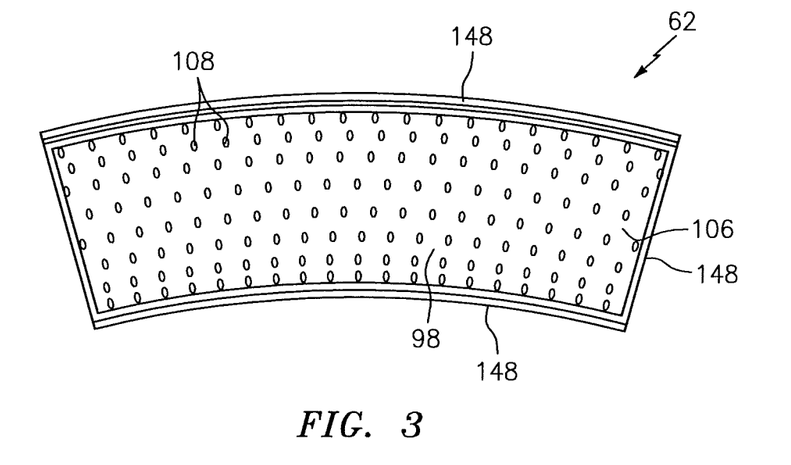
FIG. 3 is a perspective view of a multi-layered wall of the combustor.
Figure 4:
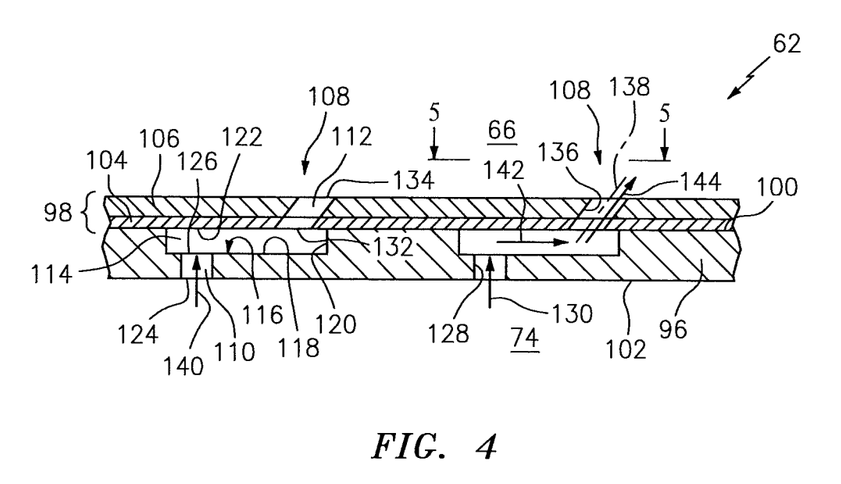
FIG. 4 is a partial cross section of the multi-layered wall of the combustor illustrating film cooling circuits.

Referring to FIGS. 3 and 4, a portion or a rectilinear panel of the multi-layered, inner, wall 62 of the combustor 56 is illustrated to show one, non-limiting, embodiment of the disclosure; however, it is understood that the same teachings may apply to the outer wall 60. Each panel or wall 62 has a base layer 96 and a thermal barrier coating 98 that covers layer 96 and radially defines at least in-part a boundary of the combustion chamber 66. The layer 96 has a first or hot face 100 covered and thermally protected by the coating 98, and an opposite second or cold face 102 that is exposed to and defines, at least in-part, a boundary of the inner cooling plenum 74.

The coating 98 may include a first layer 104, which may be a bond layer, secured directly to the hot face 100 of the base layer 96, and a thermal barrier layer 106 that covers the bond layer 104 and is directly exposed to the combustion chamber 66. Because of the single-walled orientation of the wall 62, the base layer 96 may be formed from a sheet metal material or may otherwise be forged and/or machined, and/or made of composite or ceramic materials. If the layer 96 is a sheet metal or forging, examples of material compositions may include Inconel (AMS5599), Hastelloy, Haynes, Waspalloy, or similar materials. If the layer 96 is a composite and/or ceramic, such may include matrix, fiber reinforced, metal-reinforced, or monolithic compositions. Alternatively, and for smaller combustors, the layer 96 may be cast and may be made of a nickel-based super alloy, such as PWA 1455, or other suitable super alloys capable of withstanding elevated temperatures.

The bond layer 104 may be a high temperature resistant, metallic, plating compatible with the base layer alloy; may be associated with a thermal, corrosion prevention, and/or environmental coating system; may be made of any variety of materials including nickel, cobalt, chromium, aluminum, and others; and, may be applied to the base layer via plating, brazing, plasma spray, electron beam, vapor deposition, cathodic arc, sputtering, or other means. The thermal barrier layer 106 may be one or more layers and may be made of ceramic based materials and/or any combination of yttria, zirconium and others. The bond coat 104 may have a thickness within the range of 0.002 inches to 0.010 inches (0.051 millimeters to 0.254 millimeters) and preferably within the range of 0.007 inches to 0.010 inches (0.178 millimeters to 0.254 millimeters) to facilitate structural integrity. The thermal barrier coat 114 may have a thickness within the range of 0.005 inches to 0.050 inches (0.127 millimeters to 1.27 millimeters).

It is further contemplated and understood that the bond layer may be a metallic alloy having lower strength and higher ductility as compared to the base layer 96. For example, the bond layer 104 may be made of INCONEL 625 and the base layer may be made of INCONEL 718. It is further understood that the bond layer 104 may be any coating and not necessarily needed for bonding of the thermal barrier layer. For instance, the layer 104 may be made of the same material as the base layer.

The wall 62 further includes a plurality of cooling circuits 108 (which may be film cooling circuits) for flowing cooling air from the plenum 74, through the wall 62, and into the combustion chamber 66. The cooling air flowing into the combustion chamber 66 may generally form a film of cooling air over the thermal barrier layer 106 for additional thermal protection of the wall from the hot combustion gases. The cooling circuit 108 has an aperture 110, a cooling hole 112 (which may be a film cooling hole) and a channel 114 in fluid communication between the aperture 110 and the hole 112.

The channel 114 is generally recessed into the base layer 96. A surface 116 of the circuit 108 is carried by the base layer 96, is contiguous to and recessed from the hot face 100, and defines a boundary of the channel 114. The surface 116 may include a bottom portion 118 that generally faces toward the combustion chamber 66 and a continuous, peripheral, side portion 120 that spans between the bottom portion 118 and the hot face 100 and surrounds the bottom portion 118. A boundary of the channel 114 may be defined in totality by the bottom portion 118, the side portion 120 and a portion 122 of the bond layer 104 of the coating 98 that spans above or over the channel 114.

Figure 5:
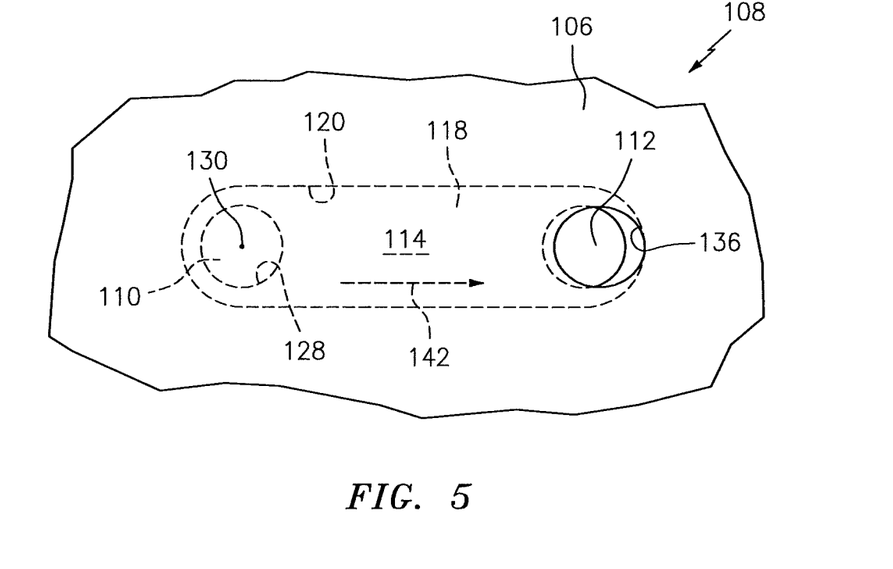
FIG. 5 is a partial plan view of the multi-layered wall.

Referring to FIGS. 4 and 5, the aperture 110 of the film cooling circuit 108 is in and defined by the base layer 96, and extends through the cold face 102 and the bottom portion 118 of the recessed surface 116 to communicate directly between the plenum 74 and the channel 114. That is, the aperture 110 has an inlet 124 defined by a continuous edge of the cold face 102 of the base layer 96 and an outlet 126 defined by a continuous edge of the bottom portion 118 of the surface 116. A surface 128 of the circuit 108 is carried by the base layer 96 and extends continuously about an aperture centerline 130, thereby defining a boundary of the aperture. The centerline 130 traverses, and is transverse to, the bottom portion 118 of the channel surface 116 and may be substantially normal to portion 118.

The hole 112 is in and defined by the coating 98 to communicate directly between the channel 114 and the combustion chamber 66. That is, the hole 112 has an inlet 132 defined by a continuous edge of the bond layer 104 and an outlet 134 defined by a continuous edge of the thermal barrier layer 106. A surface 136 of the circuit 108 is carried by both the bond layer 104 and the thermal barrier layer 106 of the coating 98 and extends continuously about a hole centerline 138, thereby defining a boundary of the hole. The centerline 138 may extend at an angle through the coating 98 such that the inlet and outlet 132, 134 may generally be oval in shape.

The aperture 110 is generally offset from the hole 112. That is, the aperture 110 may communicate with one end of the channel 114, and the hole 112 may communicate with an opposite end of the channel. The orientations of the aperture 110, the channel 114, and the hole 112 are such that a direction of flow (see arrow 140) in the aperture 110 may be substantially normal to a direction of flow (see arrow 142) in the channel 114, and a direction of flow (see arrow 144) in the hole 112 may be angled with respect to the direction of flow 142. The direction of flow 144 may be angled by about thirty degrees to enhance the formation of a film of cooling air across the thermal barrier layer 106. It is further contemplated and understood that this angle may be within a range of about twenty degrees to ninety degrees depending upon a particular location and cooling need.

The plurality of cooling circuits 108 may be arranged in various densities and flow-directional orientations across the wall or panel 62. That is, to eliminate hot spots on the wall, one area of the wall may require more cooling circuits 108 than another. Furthermore, in one area of the wall 62 the circuits 108 may be arranged to create a film cooling blanket that flows in a substantially circumferential direction with respect to axis A, while on another area of the wall 62 the film cooling blanket flow substantially in an axial direction. The circuits 108 may further be arranged near or about specific areas of the wall 62 that are difficult to cool through more traditional film cooling holes. Such areas may include dilution holes and/or associated grommets 146, wall support structures (not shown), peripheral panel rims 148, and igniter holes 150 (see FIGS. 2 and 3).

Figure 6:
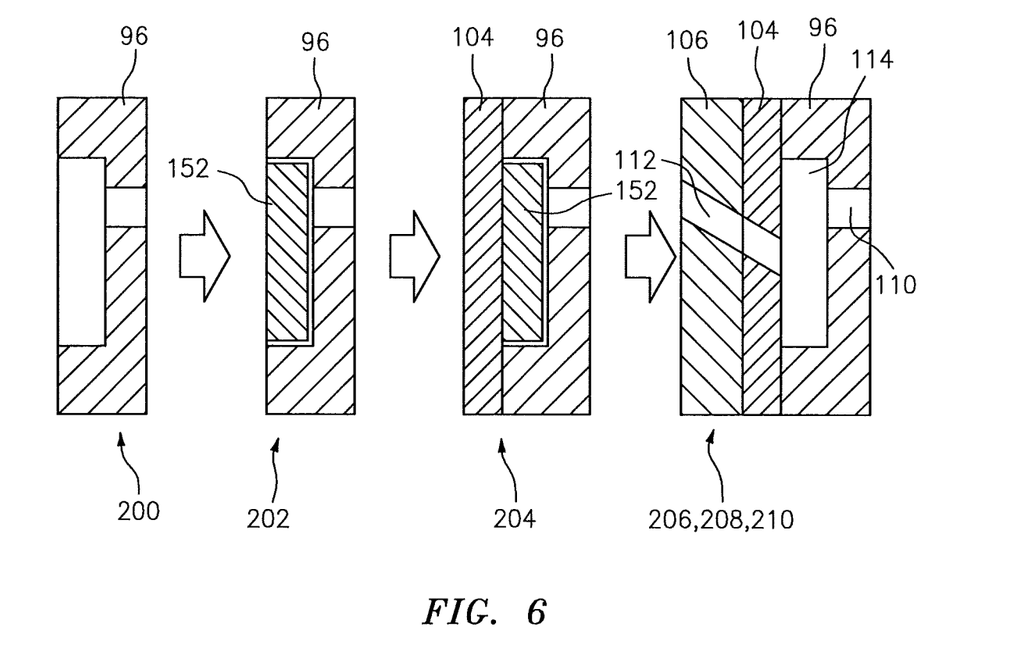
FIG. 6 is a series of cross sections of the film cooling circuit during various stages of manufacturing.
Figure 7:
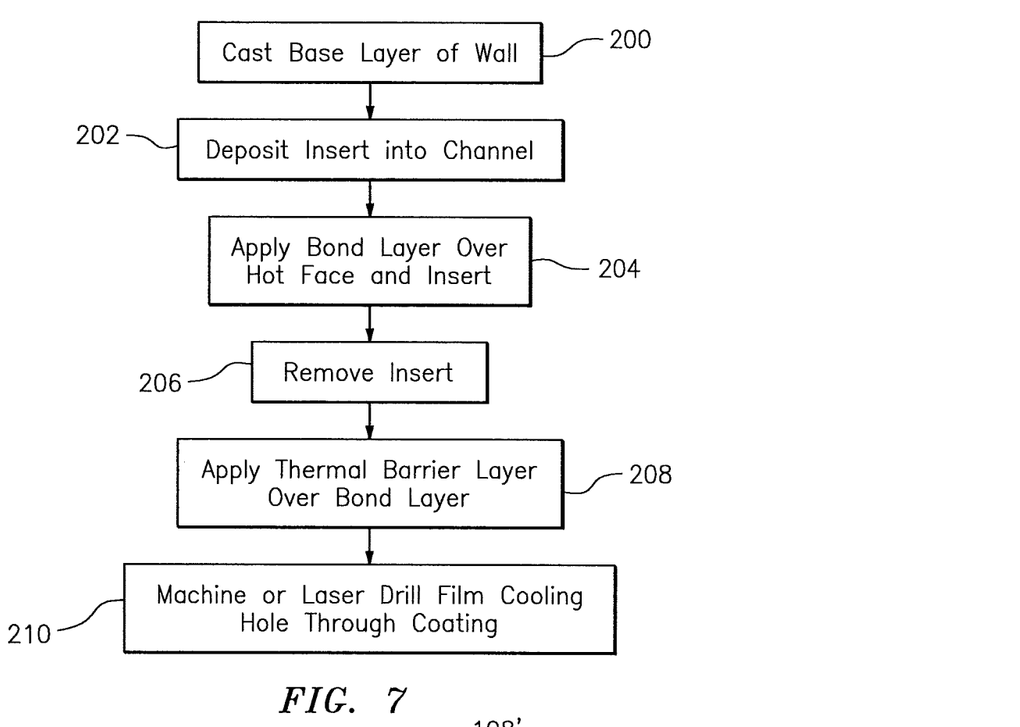
FIG. 7 is a flow chart of a manufacturing method of the multi-layered wall with the film cooling circuits.

Referring to FIGS. 6 and 7, a method of manufacturing the film cooling circuit 108 is generally illustrated. As step 200, the base layer 96 of the multi-layered wall 62 may be fabricated by conventional means with the aperture 110 and the channel 1114 machined into the base layer. As step 202, a sacrificial insert 152 (e.g. wax and/or masking) may be placed into and may fill the channel 114. As step 204, the bond layer 104 may be placed over the hot face 100 of the base layer 96 and the insert 152 via metallic plating, brazing, plasma spray, deposition or other means. As step 206, the insert 152 may be removed through the aperture 110 by conventional means. As step 208, the thermal barrier layer 106 may be added over the bond layer 104 via plasma spray or a deposition method, as two, non-limiting, examples. As a final step 210, the film hole 112 may be laser drilled through the coating layers 104, 106 or machined by other mechanical means. It is further contemplated and understood that removal of the insert 144 may be achieved through the film holes 112 or a combination of the holes and apertures. In such an example, removal of the insert 152 may be after the film holes are laser drilled through the layers 104, 106.

Figure 8:
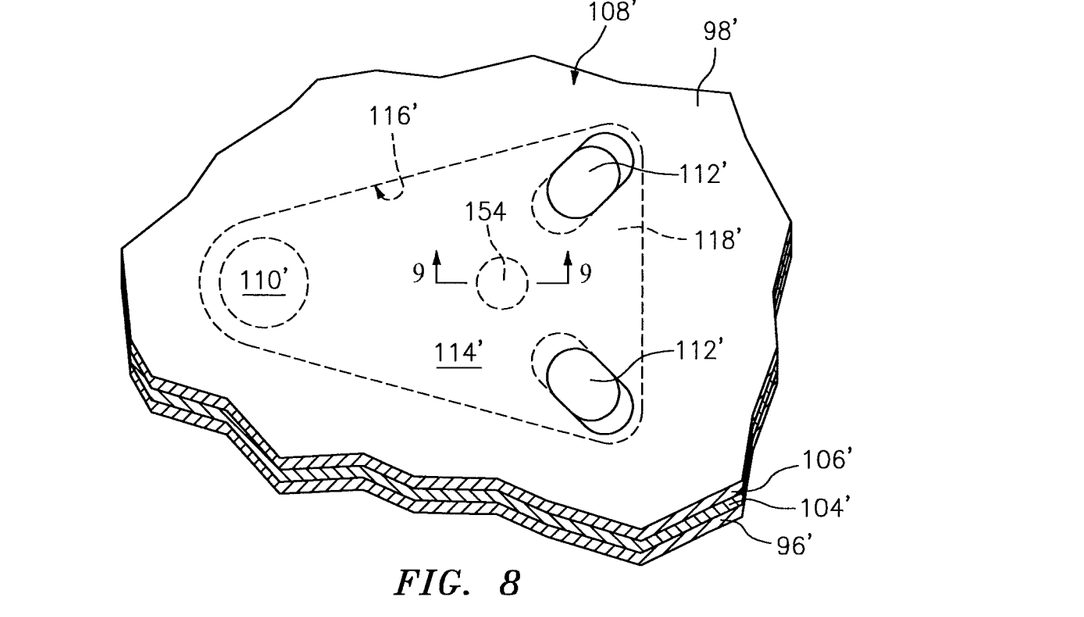
FIG. 8 is a partial plan view of a multi-layered wall illustrating a second embodiment of a film cooling circuit.
Figure 9:
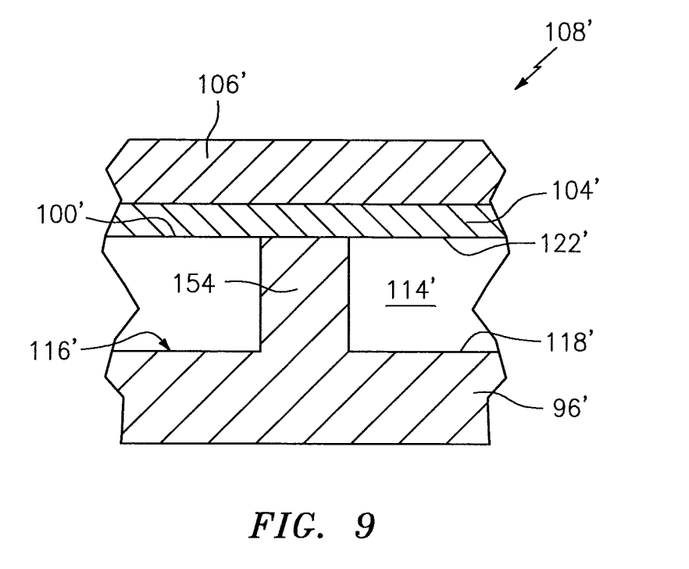
FIG. 9 is a partial cross section of the film cooling circuit taken along line 9-9 of FIG. 8.

Referring to FIGS. 8 and 9, a second embodiment of a film cooling circuit is illustrated wherein like elements have like identifying numerals except with the addition of a prime symbol. The circuit 108' of the second embodiment has an aperture 110', a plurality of film cooling holes 112' (two illustrated as one, non-limiting, example) and a channel 114' in fluid communication between the aperture 110' and the holes 112'. The channel 114' is generally in a base layer 96', and is defined by a surface 116' recessed from the hot face 100'. A boundary of the channel 114' is defined by the surface 116' and a portion 122' of a bond layer 104' of a coating 98' that substantially covers the hot face 100'.

The circuit 108' may further include a stanchion or pedestal 154 that contacts and spans between a bottom portion 118' of the surface 116' and the portion 122' of the bond layer 104' for providing additional bond layer support. The pedestal 154 may generally be any shape that provides sufficient structural integrity and may further be shaped to guide and distribute cooling air flow from the aperture 110' and to the holes 112'. The pedestal 154 may further be one unitary piece with the base layer 96', may be machined, or may be later added in a manufacturing operation such as brazing as one, non-limiting, example. It is further contemplated and understood that more than one pedestal 154 may be added for additional structural support and/or flow distribution. It is further contemplated and understood that the pedestal 154 may further be a pin, a wall, or any variety of other structural shapes. Such shapes, or portions thereof, may only facilitate flow distribution, and thus may project from the bottom portion 118', but may fall short of, and does not connect to, the bond layer 104'.

Figure 10:
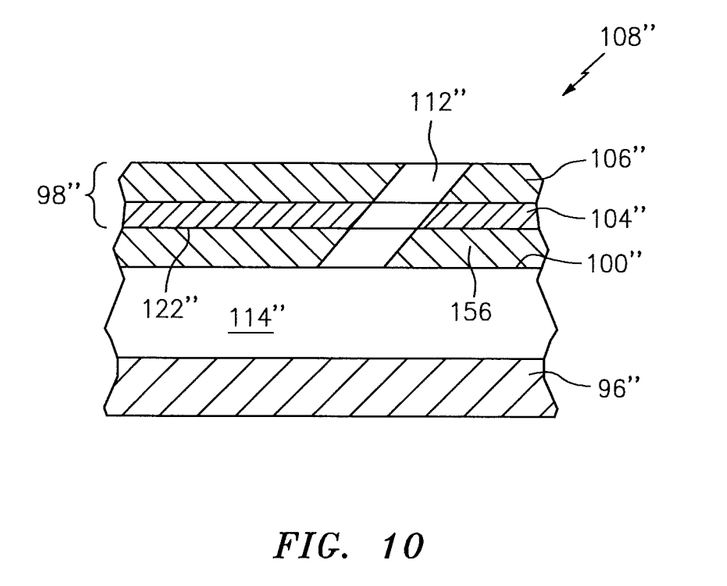
FIG. 10 is a partial cross section of a multi-layered wall illustrating a third embodiment of a film cooling circuit.

Referring to FIG. 10, a third embodiment of a film cooling circuit is illustrated wherein like elements have like identifying numerals except with the addition of a double prime symbol. The circuit 108" of the third embodiment may include an additional layer or sheet 156 located between a coating 98" and a base layer 96". A portion of the layer 156 may define in-part a channel 114" and provide additional structural support for portion 122" of the coating 98". A cooling hole 112" may be machined through the coating 98" and the layer 156. The layer 156 may be made of the same super alloy as the base layer 96" and may be applied through conventional means after the base layer 96" is fabricated. Depending upon the application technique of the layer 156, masking of the channel 114" may not be required.

It is understood that relative positional terms such as "forward," "aft," "upper," "lower," "above," "below," and the like are with reference to the normal operational attitude and should not be considered otherwise limiting. It should be understood that like reference numerals identify corresponding or similar elements throughout the several drawings. It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A single-walled combustor comprising:
   a base layer having a first face defining in-part a cooling plenum and an opposite second face;
   a structural support layer placed over the second face and defining in-part a channel;
   a thermal barrier coating placed over the structural support layer opposite the base layer and defining at least in-part a combustion chamber; and
   a plurality of cooling circuits with each circuit extending through the base layer, the structural support layer, and the thermal barrier coating and being in fluid communication between the cooling plenum and the combustion chamber, wherein each cooling circuit of the plurality of cooling circuits includes a first surface recessed from the second face and spaced from an opposing second surface of the structural support layer with the channel defined by the first surface, the second surface, and a peripheral surface of the base layer extending from the first surface to the second surface, each cooling circuit further comprising a hole in the structural support layer and the thermal barrier coating being in fluid communication between the channel and the combustion chamber;
   wherein the thermal barrier coating includes a bond coat adhered to the structural support layer, and the thermal barrier coating includes a thermal barrier coat covering the bond coat, and the hole;
   wherein the base layer comprises a first material, the structural support layer comprises the first material, and the bond coat comprises a second material different than the first material;
   wherein each cooling circuit includes an aperture extending through the first face and the first surface and being in fluid communication between the cooling plenum and the channel;
   wherein the peripheral surface defines a first side of the channel, extending between an upstream end and a downstream end, and a second side of the channel, opposite the first side and extending between the upstream end and the downstream end, wherein a first width between the first side and the second side at the downstream end of the channel is greater than a second width between the first side and the second side at the upstream end of the channel, and wherein the aperture is disposed at the upstream end and the hole is disposed at the downstream end;
   wherein the channel includes a channel centerline extending between the upstream end and the downstream end of the channel, wherein the hole is a first hole of a plurality of holes including a second hole, and wherein the first hole is disposed between the channel centerline and the first side of the channel and the second hole is disposed between the channel centerline and the second side of the channel.

2. The single-walled combustor set forth in claim 1, wherein the aperture includes an inlet defined by the first face and an outlet defined by the first surface.

3. The single-walled combustor set forth in claim 1, wherein the aperture is defined by a second surface extending continuously about an aperture centerline that generally traverses the first surface.

4. The single-walled combustor set forth in claim 1, wherein the hole is a film cooling hole.

5. The single-walled combustor set forth in claim 4, wherein the film cooling hole is defined by a third surface carried by the thermal barrier coating and extending continuously about a centerline of the hole that is angled with respect to a hot face of the thermal barrier coating that defines at least in-part the combustion chamber.

6. The single-walled combustor set forth in claim 1, wherein the base layer is made of sheet metal.

7. The single-walled combustor set forth in claim 1, wherein the base layer is circumferentially continuous about an engine axis.

8. The single-walled combustor set forth in claim 1 further comprising:
   an inner base layer spaced radially inward from the base layer being an outer base layer;
   a second thermal barrier coating secured to the inner base layer and opposing the thermal barrier coating being a first thermal barrier coating; and
   a second plurality of cooling circuits extending through the inner base layer and the second thermal barrier coating, wherein the combustion chamber is annular in shape and defined at least in-part by the first and second thermal barrier coatings.

9. The single-walled combustor set forth in claim 1, wherein a direction of cooling flow through the channel is substantially planar to the base layer and angled with a direction of flow through the hole.

10. The single-walled combustor set forth in claim 1, wherein the aperture is disposed along the channel centerline.

11. A single-walled combustor comprising:
    a base layer having a first face defining in-part a cooling plenum and an opposite second face;
    a structural support layer placed over the second face and defining in-part a channel;

a thermal barrier coating placed over the structural support layer opposite the base layer and defining at least in-part a combustion chamber;

a cooling circuit extending through the base layer, the structural support layer, and the thermal barrier coating and being in fluid communication between the cooling plenum and the combustion chamber, wherein the cooling circuit includes a first surface recessed from the second face and spaced from an opposing second surface of the structural support layer with the channel defined by the first surface, the second surface, and a peripheral surface of the base layer extending from the first surface to the second surface, the cooling circuit further comprising a hole in the structural support layer and the thermal barrier coating being in fluid communication between the channel and the combustion chamber; and wherein the base layer comprises a first material, the structural support layer comprises the first material, and a bond coat comprises a second material different than the first material;

wherein the cooling circuit includes an aperture extending through the first face and the first surface and being in fluid communication between the cooling plenum and the channel;

wherein the peripheral surface defines a first side of the channel, extending between an upstream end and a downstream end, and a second side of the channel, opposite the first side and extending between the upstream end and the downstream end, wherein a first width between the first side and the second side at the downstream end of the channel is greater than a second width between the first side and the second side at the upstream end of the channel, and wherein the aperture is disposed at the upstream end and the hole is disposed at the downstream end;

wherein the channel includes a channel centerline extending between the upstream end and the downstream end of the channel, wherein the hole is a first hole of a plurality of holes including a second hole, and wherein the first hole is disposed between the channel centerline and the first side of the channel and the second hole is disposed between the channel centerline and the second side of the channel.

12. The single-walled combustor set forth in claim 11, channel and wherein the aperture is disposed along the channel centerline.

* * * * *

UNITED STATES PATENT AND TRADEMARK OFFICE
CERTIFICATE OF CORRECTION

PATENT NO. : 10,788,210 B2
APPLICATION NO. : 14/849017
DATED : September 29, 2020
INVENTOR(S) : Steven Burd Page 1 of 1

It is certified that error appears in the above-identified patent and that said Letters Patent is hereby corrected as shown below:

Column 12, Line 21, Claim 12, please delete "channel and"

Signed and Sealed this
Tenth Day of November, 2020

Andrei Iancu
*Director of the United States Patent and Trademark Office*